US009239042B2

(12) United States Patent
Frankenstein et al.

(10) Patent No.: US 9,239,042 B2
(45) Date of Patent: Jan. 19, 2016

(54) SYSTEM FOR MONITORING THE CONDITION OF ROTOR BLADES AT WIND TURBINES

(75) Inventors: Bernd Frankenstein, Ullersdorf (DE); Bianca Weihnacht, Dresden (DE); Ralf Rieske, Dresden (DE); Daniel Fischer, Dresden (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 929 days.

(21) Appl. No.: 13/411,192

(22) Filed: Mar. 2, 2012

(65) Prior Publication Data
US 2012/0224966 A1    Sep. 6, 2012

(30) Foreign Application Priority Data

Mar. 3, 2011    (EP) .................................. 11001767

(51) Int. Cl.
*F03D 11/00*    (2006.01)
*G01N 29/04*    (2006.01)

(52) U.S. Cl.
CPC ......... F03D 11/0091 (2013.01); *F05B 2260/80* (2013.01); *F05B 2270/804* (2013.01); *F05B 2270/81* (2013.01); *Y02E 10/722* (2013.01)

(58) Field of Classification Search
CPC ................. F03D 11/0091; F05B 2270/804
See application file for complete search history.

(56) References Cited

U.S. PATENT DOCUMENTS

| 4,002,031 | A | * | 1/1977 | Bell ........................... 60/641.15 |
| 4,228,349 | A | * | 10/1980 | Ettenberg et al. ............. 250/226 |
| 5,170,274 | A | * | 12/1992 | Kuwata et al. ................ 398/198 |
| 5,590,090 | A | * | 12/1996 | Duggal et al. ..................... 367/7 |
| 2012/0253697 | A1 | * | 10/2012 | Frankenstein et al. .......... 702/39 |

FOREIGN PATENT DOCUMENTS

| DE | 100 65 314 A1 | 7/2002 |
| DE | 10065314 A1 | 7/2002 |
| DE | 102006037900 | 2/2008 |
| EP | 1630097 | 3/2006 |
| GB | 2 165 712 A | 4/1986 |
| GB | 2276958 | 10/1994 |

(Continued)

OTHER PUBLICATIONS

Machine translation of WO 2010/136151.*

(Continued)

*Primary Examiner* — Richard Edgar
*Assistant Examiner* — Brian O Peters
(74) *Attorney, Agent, or Firm* — Schwegman Lundberg & Woessner, P.A.

(57) ABSTRACT

Some examples relate to a system for monitoring the condition of rotor blades at wind turbines. A plurality of sensor nodes can be coupled to a rotor blade. A respective at least one sensor can be present at the individual sensor nodes for the spatially resolved detection of vibrations and/or acoustic waves of the rotor blade and the sensor nodes can be connected via optical fibers to a central supply and reception unit. A light source can be present at the central supply and reception unit and electromagnetic radiation can be conducted from it via an optical fiber to a photovoltaic converter with which the received electromagnetic radiation can be converted into electric energy. The electric energy can be utilized.

20 Claims, 7 Drawing Sheets

(56) References Cited

FOREIGN PATENT DOCUMENTS

Figure 1:
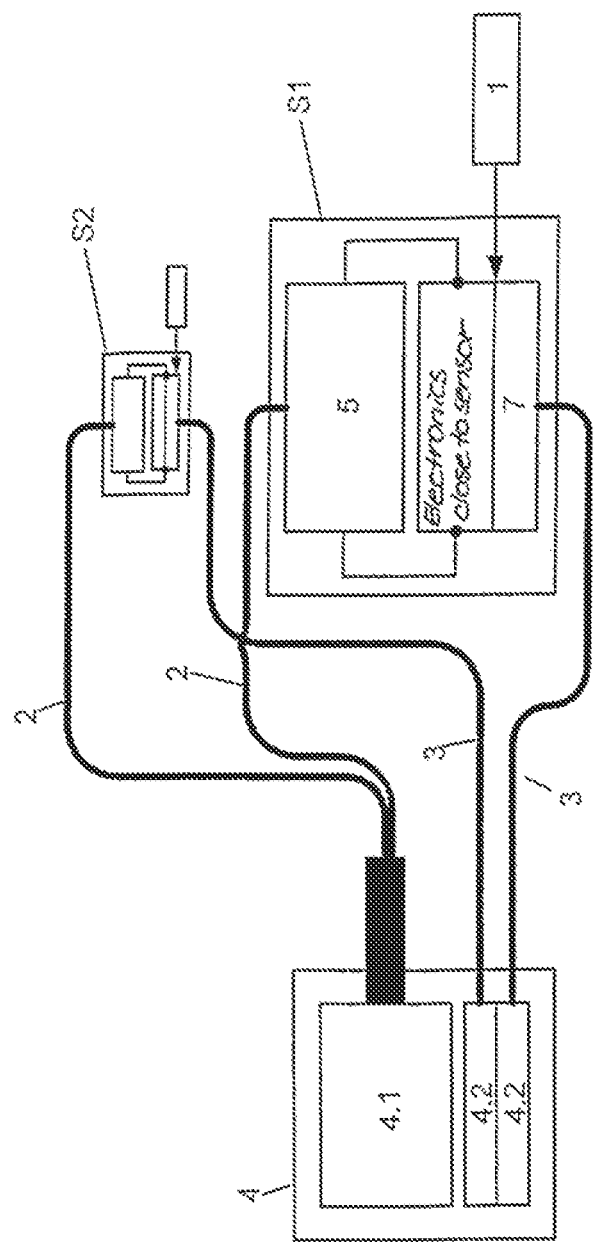

| WO | WO-2010/136151 | | 12/2010 |
|---|---|---|---|
| WO | WO-2010/136151 | A2 | 12/2010 |
| WO | WO-2011/029439 | A1 | 3/2011 |

OTHER PUBLICATIONS

"Opposition Statement Against European Patent 2 495 434 by Enercon GmbH, dated Feb. 6, 2015 [with English translation]", 10 pgs.

* cited by examiner

SYSTEM FOR MONITORING THE CONDITION OF ROTOR BLADES AT WIND TURBINES

CLAIM OF PRIORITY

This application claims the benefit of priority under 35 U.S.C. §119(a)-(d) of European Patent Application Serial Number 11 001 767.0, entitled "SYSTEM FOR MONITORING THE CONDITION OF ROTOR BLADES AT WIND TURBINES," filed on Mar. 3, 2011, the benefit of priority of which is claimed hereby, and which is incorporated by reference herein in its entirety.

The document relates to a system for monitoring the condition of rotor blades at wind turbines.

In conventional monitoring systems for wind turbines, only components of the drive such as pumps, motors, transmissions and the vibrations of the tower are monitored. First approaches for monitoring rotor blades for damage are described in the patent application, not prepublished, PCT/DE2010/001087. Accordingly, self-oscillations of a rotor blade occurring globally at the rotor blade and locally guided elastic waves should be permanently detected with time and spatial resolution using model-based methods with a sensor network and actuator network attached to a rotor blade and using a network arrangement of ultrasound transducers. In addition, elastic waves which are guided periodically predefinable time intervals and which are respectively emitted by an actuator or ultrasound transducer and detected by sensors or ultrasound transducers and are in so doing inspected for changes of the emitted waves.

A monitoring of in particular very large wind turbines such as are used, for example, in off-shore wind parks with rotor blade lengths >50 m, is in this respect becoming more and more interesting and it is necessary in this respect to carry out the monitoring at least almost permanently and non-destructively to detect damage such as breaks, cracks or delaminations promptly and with sufficient security. A repair or a replacement of damaged rotor blades can then take place with sufficient security and a replacement on suspicion such as is frequently the case at the moment can be avoided.

A network used for such a monitoring has sensors which are arranged distributed over the total surface of the rotor blade and which are supplied with electric energy and from which the detected measured signals have to be forwarded. However, this takes place via metallic conductors, as a rule copper wires or copper cables.

However, a plurality of disadvantages result from this. On the one hand, the mass of a rotor blade thus equipped thereby increases as a consequence of the high mass of the copper with the insulation. On the other hand, possible lightning strikes cause problems since damage to electric components of the wind turbine can also occur due to the thus caused electrical induction voltages in the kV range in addition to damage directly to the rotor blade. The probability of lightning strikes in such rotor blades is very high due to the construction size and the usually selected free locations for wind turbines.

The negative influencing by lightning strikes can only be taken into account by large conductor cross-sections and the use of a correspondingly shielded outer insulation. However, this results in an increase in the mass of a monitoring system and in the costs. The reduced data transmission rate through metallic conductors can also be problematic.

There are thus approaches which realize the energy supply and the transmission of measured data optically. It is thus proposed in GB 2 165 712 A, for example, to direct electromagnetic radiation from an LED through an optical fiber onto detectors which convert the energy into electric voltage. Photovoltaic cells can be used for this purpose.

In the application in question for a monitoring of the condition of rotor blades, however, a large number of sensors which are arranged distributed over the large surface of the rotor blade have to be sufficiently supplied with electric energy and the measured signals detected by the sensors have to be reliably transmitted for an evaluation. The large required number of sensors is required for a high spatial resolution and due to the attenuation of vibrations or waves in the material.

Certain examples therefore provide a system for monitoring rotor blades in which external influences due to electric fields or lightning strikes can be avoided and in this respect a reliable operation can be achieved with lower energy required therefore.

These benefits are provided by a system having the features of claim 1. Advantageous further developments and embodiments of the present subject matter can be realized using features designated in the subordinate claims.

In various examples for monitoring the condition of rotor blades at wind turbines, a plurality of sensor nodes are fastened to a rotor blade or are integrated in the rotor blade. They can be arranged distributed more or less uniformly over the surface or within the volume of the respective rotor blade. The density of the arrangement of sensor nodes can be increased in critical regions which are exposed to higher strains or which are constructionally critical so that the spacing between the sensor nodes can be smaller there than in non-critical regions.

A respective at least one sensor for the spatially resolved detection of vibrations and/or acoustic waves of the rotor blade is present at the individual sensor nodes. The sensors can be piezoelectric elements or ultrasound transducers which are already used in conventional systems. The sensor nodes are connected via optical fibers to a central supply and reception unit. In larger systems, however, two or more such supply and reception systems can also be provided for a rotor blade which are then, however, each connected to a plurality of sensor nodes via optical fibers.

A light source is present at the central supply and reception unit and electromagnetic radiation is conducted from it via an optical fiber to a photovoltaic converter of the sensor nodes with which the received electromagnetic radiation is converted into electric energy and the electric energy can be used for the operation of electronics close to the sensor and of a light source or an optical modulator. The measured signals detected by the respective sensor can be transmitted by means of the electronics close to the sensor via optical fibers to optical detectors present at the central supply and reception unit. It should be ensured in this respect that the local association of the measured signals to the respective sensor node is possible.

The energy of the electromagnetic radiation which is coupled from the light source of the supply and reception unit into an optical fiber is then directed onto photovoltaic converters by sensor nodes and is converted into electric energy therein. This energy can then be utilized for detecting, processing and transmitting measured signals which were detected by a sensor of the respective sensor node. For this purpose, the electronics close to the sensor of a sensor node can be used which can be formed by an analog/digital converter and/or a microprocessor and/or a clock and/or a driver circuit for the light source or for an optical modulator. An additional electric energy storage element (capacitor, accumulator) can also be present there to enable a more stable operation or also conditions with increased energy requirements. An increased energy requirement arises, for example, when not only a passive analysis should be carried out using measured signals detected by sensors, but also vibrations and/or acoustic waves should be coupled actively into a rotor blade which can then in turn be detected using other sensors arranged at a spacing from the correspondingly actively operated sensor node. Such an actively operable sensor node is provided with a sensor/actuator which can both actively couple vibrations and/or acoustic waves into a rotor blade by means of applied pulsed or electric alternate voltage or can excite vibrations of the rotor blade and can also passively detect vibrations and/or acoustic waves of the rotor blade caused in another form. The active and passive operation should be carried out alternately in this respect.

It is advantageous to use a laser light source with a vertical resonator (VCSEL) as light sources. This relates both to the light source of the central supply and reception unit and to light sources of the sensor nodes since these light sources can be operated very effectively and in particular have a high reliability and the required space and the mass are small. A Mach-Zehnder modulator at sensor nodes can be used as an optical modulator.

There is the possibility according to various examples to direct the electromagnetic radiation from the central supply and reception unit to sensor nodes via separate optical fibers and to use other optical fibers for the transmission of the measured signals from sensors.

The electromagnetic radiation emitted by the light sources of the central supply and reception unit and the light sources of sensor nodes or the optical modulators can, however, also be conducted at least partly via a common optical fiber. For this purpose, electromagnetic radiation having different wavelengths emitted by the different light sources, modulated electromagnetic radiation can be used or alternating operation of the light sources can be carried out.

The light source of a central supply and reception unit can be operated continuously for a continuous energy supply of sensor nodes. A pulsed operation is, however, also at least partly possible. In this respect, control signals can be transmitted to sensor nodes, such as in encoded form. This can be utilized, for example, for an active operation of sensor nodes with which vibrations and/or acoustic waves should be coupled into the rotor blade. After reception of a defined pulse sequence, electric voltage can then be supplied by means of the microprocessor to the respective sensor/actuator (ultrasound converter) with a corresponding frequency. The sensor nodes which are arranged at a suitable spacing from this sensor node and which detect the emitted vibrations and/or the acoustic waves of this sensor node can likewise be switched into this reception mode with a correspondingly encoded pulse sequence so that the detection of vibrations excited in this manner and/or of acoustic waves is known to these sensor nodes.

A sensor/actuator should be present at at least each fourth sensor node for a passive and an active operation of a system in accordance with certain examples. In this respect, a maximum of three sensor nodes only passively operated and having one sensor or only operated as a sensor can be arranged about an actively operable sensor node, with a known spacing from it. A spatially resolved monitoring at rotor blades can thus be carried out by the determination of the times of flight of waves/vibrations with a known spacing of the sensor nodes from one another and of the attenuation of the rotor blade material in the respective monitored zone of these sensor nodes.

Photovoltaic converters, in particular GaAs or Si PIN photodiodes, can be used as photovoltaic converters in the sensor nodes since they achieve a high efficiency in the energy conversion and are of small dimensions and have a small mass.

A light source of a sensor node and a photovoltaic converter can be formed as an optoelectronic element of hybrid design for an effective operation and a small construction size. The effort for the transmission of radiation and signals can thereby be reduced.

In the system in accordance with the various examples, optical coupling elements can be present between the sensor nodes and the supply and reception unit, with optical fibers being connected to them and a distribution of the electromagnetic radiation emitted by the light sources to the sensor nodes and from the sensor nodes to the optical detectors of the central supply and reception unit being possible via them.

To avoid any damage of light sources of the sensor nodes, an optical filter can be arranged between the exit surface of the light source of sensor nodes and the respective optical fiber which is only transparent for the wavelength or wavelength spectrum of the electromagnetic radiation emitted by this light source. The filter can be designed as a bandpass filter, an edge filter or as an interference filter.

There is the possibility using a system in accordance with several examples to transmit data and energy purely optically, which applies at least to critical regions at rotor blades. A complete galvanic decoupling between the sensor nodes arranged distributed over the volume and the surface of the rotor blades and the central supply and reception unit can thus be achieved. The sensitive electronic components are thus protected and also secured against lightning strike. An economic monitoring is also possible due to the small energy requirement needed (approx. 100 mW per sensor node). The service life of rotor blades can be better utilized and downtimes of wind turbines for service and repair can be shortened.

The present subject matter will be explained in more detail by way of example in the following.

Figure 2:
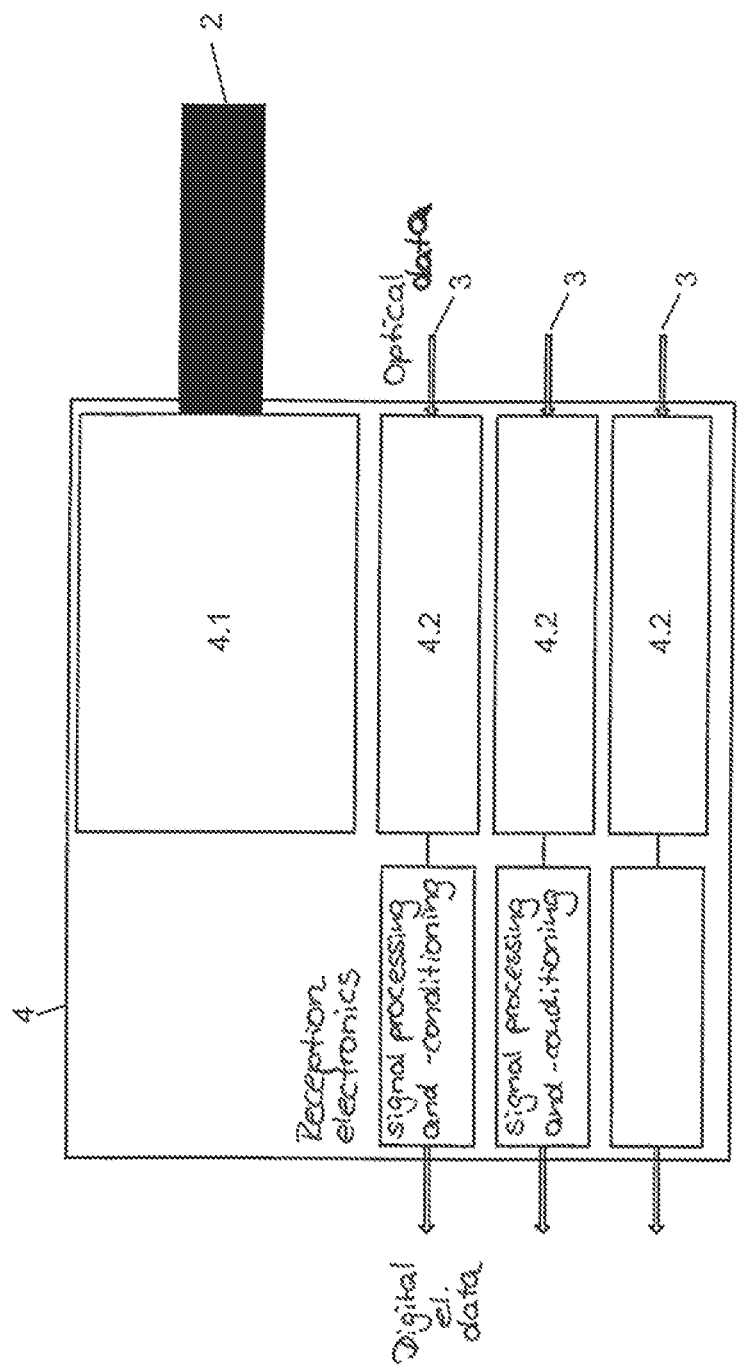
Figure 3:
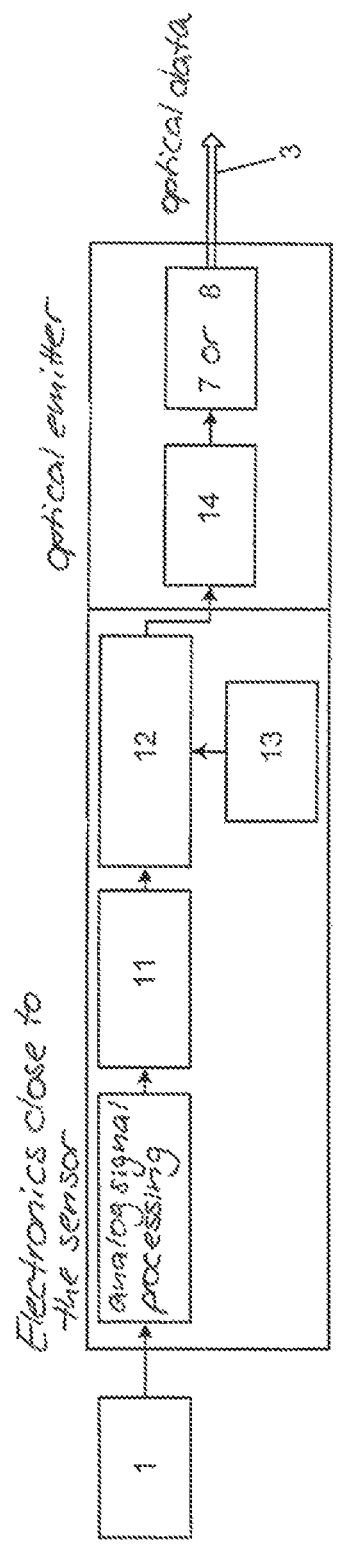
Figure 4:
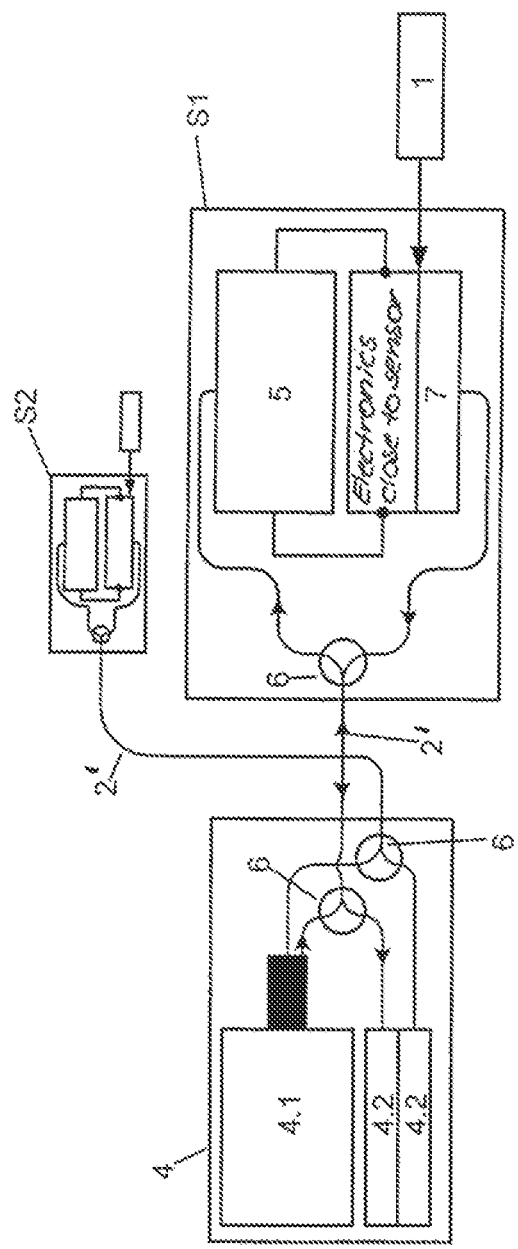
Figure 5:
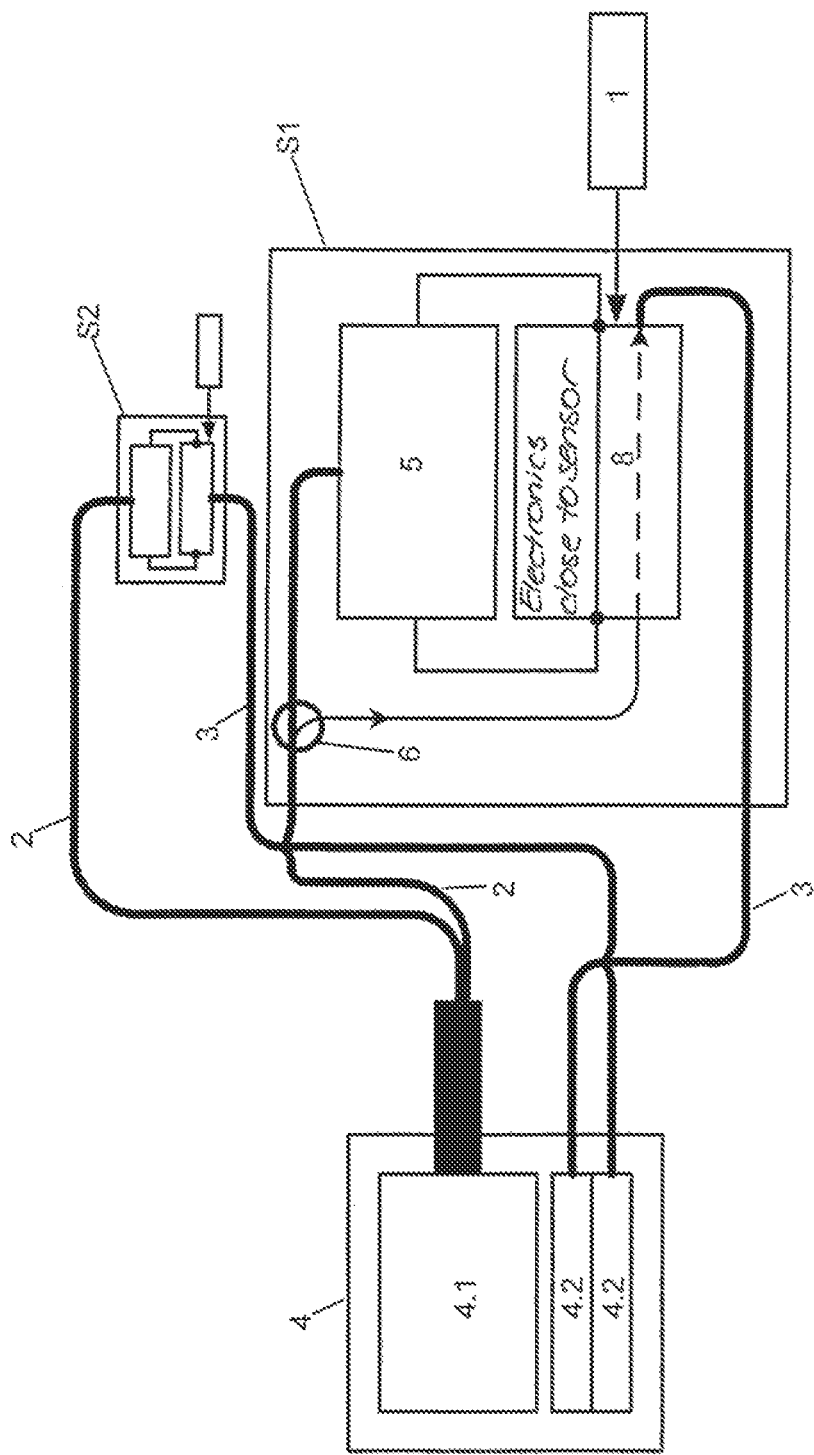
Figure 6:
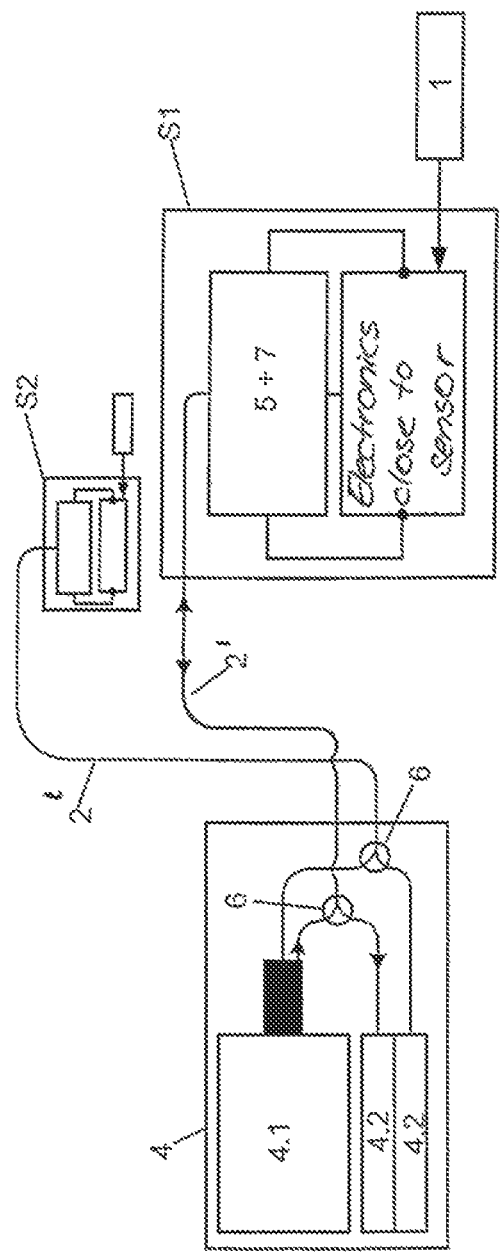
Figure 7:
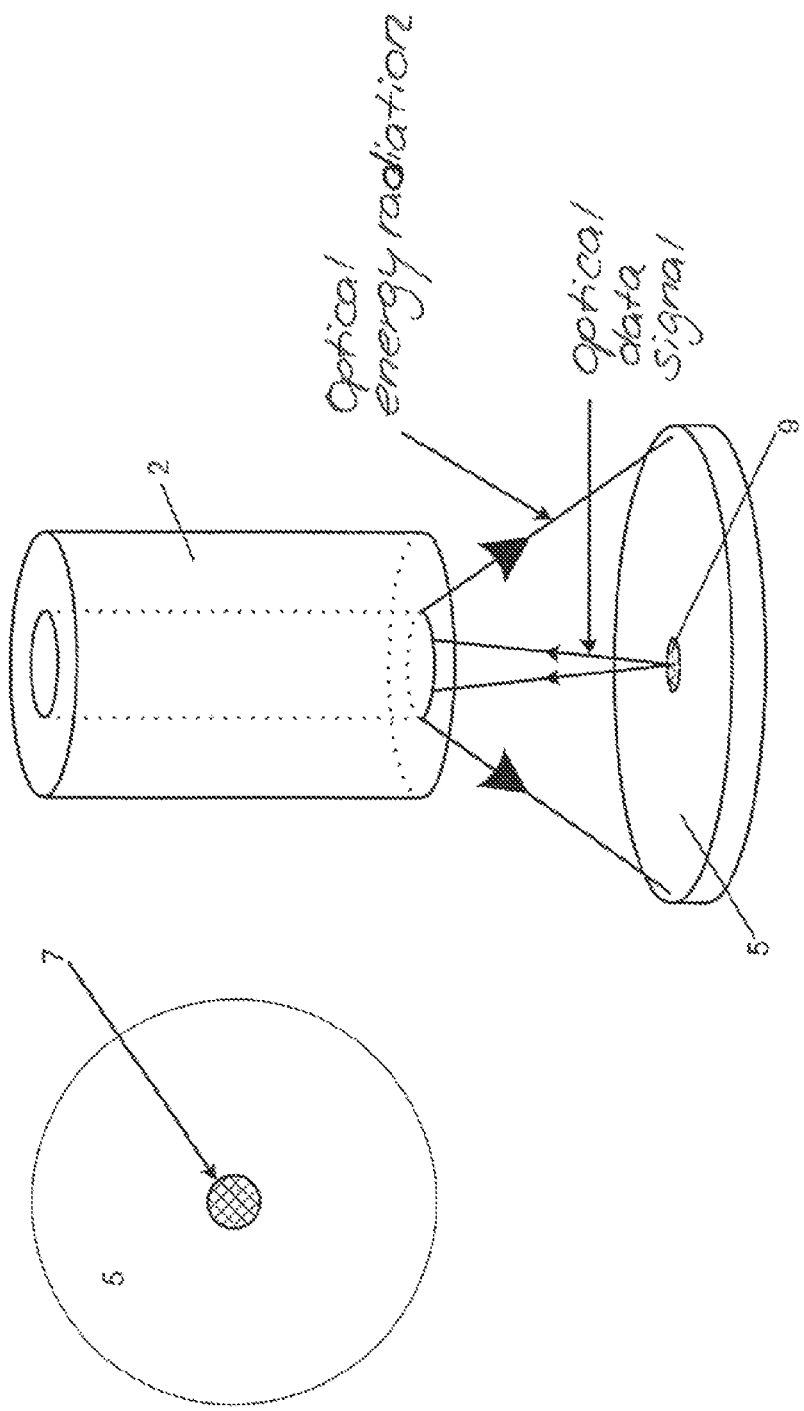

There are shown:

FIG. 1 in schematic form, an example of a system in accordance with some examples;

FIG. 2 in schematic form, an example for a central supply and reception unit;

FIG. 3 a block diagram for electronics close to the sensor for sensor nodes which can be used in some examples;

FIG. 4 in schematic form, a further example of a system in accordance with some examples;

FIG. 5 in schematic form, a third example of a system in accordance with some examples;

FIG. 6 in schematic form, a fourth example of a system in accordance with some examples; and FIG. 7 a schematic representation of an optoelectronic element of hybrid design which can be used in some examples.

In the examples of systems in accordance with some examples to be described in the following, only two sensor nodes S1 and S2 are shown for reasons of clarity in the corresponding Figures. Considerably more such sensor nodes can, however, be connected to a central supply and reception unit 4. In another respect, the same elements are marked by the same reference numerals.

In the example shown in FIG. 1 of a system in accordance with some examples, a laser diode having a vertical resonator is present at a central supply and reception unit 4 as a high-powered light source 4.1 from which the emitted monochromatic electromagnetic radiation is conducted via optical fibers 2 at a wavelength of 808 nm to the sensor nodes S1 and S2.

A plurality of optical detectors 4.2 (PIN photodiodes) are present at the central supply and reception unit 4 and measured signals of the sensor nodes S1, S2, ... Sn are optically transmitted to them via optical fibers 3. They convert the optically transmitted measured signals into equivalent electric signals. Further low-noise electric amplifiers 4.3 are present in the central supply and reception unit for amplifying the output signals of the optical detectors 4.2; filters 4.4 are present for improving the signal-to-noise ratio and decision circuits 4.5 are present for an amplitude regeneration (all not shown) (see FIG. 2).

A photovoltaic converter 5 (GaAs or Si photocell) is present at the sensor nodes S1 and S2 and the radiation emitted by the light source 4.1 is directed to it by means of the optical fibers 2. The electronics close to the sensor and the light source 7 of the respective sensor node S1, S2, ... Sn are operated at the electric voltage converted by means of the photovoltaic converter 5. When a sensor node is actively operated, the sensor/actuator 1 (piezoelectric converter, ultrasound converter) of the sensor node can also be supplied with electric voltage.

The light sources 7 of the sensor nodes S1, S2, ... Sn can also be lasers (VSCEL) which emit electromagnetic radiation.

In addition, an analog/digital converter 11 is present in the electronics close to the sensor and the measured signals detected by the sensor 1 and conducted via an analog part can be digitized with it. The digitized measured signals are supplied to the microprocessor 12 to which a clock 13 is connected. The measured signal transmission takes place from the microprocessor 12 via a driver circuit 14 to the light source 7 from which the measured signals are transmitted via the optical fibers 3 to an optical detector 4.2 of the central supply and reception unit 4 (see FIG. 3). Only a power of 100 mW is required for the operation of the electronics close to the sensor.

In the example shown in FIG. 4 of a system in accordance with some examples, the electromagnetic radiation which is emitted by the light source 4.1 and the optical measured signals from the light sources 7 of the sensor nodes S1, S2, ... Sn are conducted via an optical fiber 2'. Only optical coupling elements 6 (fused optical couplers, circulators, optical splitters, e.g. on the basis of planar optical fibers) are present with which a distribution of the respective electromagnetic radiation to the sensor nodes S1, S2, ... Sn and to the optical detectors 4.2 of the central supply and reception unit 4 takes place. All other elements can be designed as is the case in the example in accordance with FIG. 1. The measured signals of the individual sensor nodes S1, S2, ... Sn can in this respect be encoded (modulated) to enable an association with the respective sensor nodes. This can be achieved while utilizing the driver circuit 14 and/or the microprocessor 12.

In the example shown in FIG. 5, an optical modulator 8 is present instead of the light source 7 at sensor nodes S1, S2, ... Sn. In this respect, a fraction of the electromagnetic radiation emitted by the light source 4.1 is branched off using an optical coupler and is modulated in intensity by the optical modulator 8 while utilizing the driver circuit 14 influenced by the microprocessor 12 while taking account of the digitized measured signals. The modulated measured signals are coupled into separate optical fibers 3 and conducted to the optical detectors 4.2, A Mach-Zehnder modulator based on planar optical fibers can be used as an optical modulator 8.

In the example shown in FIG. 6, the photovoltaic converter 5 and the light source 7 (VSCEL) are formed together as an optoelectronic component of hybrid design at sensor nodes S1, S2, ... Sn. The electromatmetic radiation which is emitted by the light sources 4.1 and 7 can again be conducted from or to a sensor node S1, S2, ... Sn via a common optical fiber 2', as has already been explained in the example in accordance with FIG. 4.

An optical filter 9 which is only transparent for the electromagnetic radiation emitted by the light source 7 is arranged at the exit surface of the light source 7. The light source 7 can be protected from the electromataietic radiation emitted by the light source 4.1 of the central supply and reception unit 4 by the filter 9. The filter 9 can be an interference filter which reflects or absorbs all other wavelengths apart from the electromagnetic radiation of the light source 7. This structure is shown in FIG. 7.

What is claimed is:

1. A system for monitoring the condition of a rotor blade of a wind turbine, comprising:
   a central supply and reception unit;
   a central light source disposed proximal the central supply and reception unit and configured to emit electromagnetic radiation;
   a transducer node fastenable to the rotor blade, the transducer node connected via one or more optical fibers to the central supply and reception unit;
   a photovoltaic converter coupled to communicate with the central light source via the one or more optical fibers and configured to convert the electromagnetic radiation from the central light source into electric energy;
   electronics disposed proximal the transducer node and configured to receive the electric energy from the photovoltaic converter;
   a transducer disposed proximal the transducer node and the electronics, the transducer configured to spatially resolve detection of waves associated with vibratory motion of the rotor blade, wherein the electronics are coupled to the transducer and configured to power the transducer and to receive a transducer signal from the transducer;
   a distal light source and optical modulator coupled to the electronics and configured to be powered by the electric energy, wherein the optical modulator is configured to communicate with the electronics to transmit an optical transducer signal associated with the transducer signal; and
   an optical detector present at the central supply and reception unit, the optical detector coupled to the optical modulator via the one or more optical fibers and configured to receive the optical transducer signal, wherein the transducer is configured to emit waves to excite vibrations and/or acoustic waves in the rotor blade.

2. The system in accordance with claim 1, wherein the electronics close to the transducer of a transducer node include at least one of an analog/digital converter, a microprocessor, a clock and a driver circuit configured to drive the optical modulator.

3. The system in accordance with claim 1, wherein at least one of the central light source or the distal light source includes a Vertical-cavity surface-emitting laser and the optical modulator includes a Mach-Zehnder modulator.

4. The system in accordance with claim 1, wherein the one or more optical fibers is a common optical fiber.

5. The system in accordance with claim 1, wherein the photovoltaic converter includes a photovoltaic elements including at least one of GaAs cells and Si PIN photodiodes.

6. The system in accordance with claim 1, wherein the transducer includes piezoelectric elements.

7. The system in accordance with claim 1, wherein the distal light source and the photovoltaic converter form an optoelectronic element of a hybrid design.

8. The system in accordance with claim 1, wherein the transducer node is one of a plurality of transducer nodes, and the transducer is present at at least every fourth transducer node.

9. The system in accordance with claim 1, wherein an optical coupling element is arranged between the transducer node and the supply and reception unit.

10. The system in accordance with claim 1, wherein an optical filter is arranged between an exit surface of the distal light source and the optical fiber.

11. A system for monitoring the condition of rotor blades at wind turbines, wherein a plurality of sensor nodes are fastened to a rotor blade or are integrated in the rotor blade, wherein at least one respective sensor is present at the sensor nodes for the spatially resolved detection of vibrations and/or acoustic waves of the rotor blade and the sensor nodes are connected via optical fibers to a central supply and reception unit,
wherein a central light source is present at the central supply and reception unit and electromagnetic radiation is conducted from it via an optical fiber to a photovoltaic converter with which the received electromagnetic radiation is converted into electric energy and the electric energy is able to be used for the operation of electronics close to the sensor and of a distal light source or an optical modulator, by which the measured signals detected by the sensor can be transmitted to optical detectors present at the central supply and reception unit via optical fibers, wherein vibrations and/or acoustic waves are capable of being excited in the rotor blade, and wherein a sensor/actuator is present at least one of the sensor nodes and the vibrations and/or acoustic waves excited in the rotor blade are capable of being detected by the sensor/actuator.

12. The system in accordance with claim 11, wherein the electronics close to the sensor of a sensor node are formed with an analog/digital converter and/or a microprocessor and/or a clock and/or a driver circuit for the light source or the optical modulator.

13. The system in accordance with claim 11, wherein the light source(s) is/are (a) laser light source(s) having a vertical resonator (VCSEL) and an optical modulator is a Mach-Zehnder modulator.

14. The system in accordance with claim 11, wherein the electromagnetic radiation emitted by the light sources or the optical modulator is conducted via a common optical fiber.

15. The system in accordance with claim 11, wherein the photovoltaic converters in the sensor nodes are photovoltaic elements, in particular GaAs cells or Si PIN photodiodes.

16. The system in accordance with claim 11, wherein the sensors and/or the sensors/actuators are piezoelectric elements.

17. The system in accordance with claim 11, wherein the distal light source and the photovoltaic converter form an optoelectronic element of a hybrid design.

18. The system in accordance with claim 11, wherein a sensor/actuator is present at at least every fourth sensor node.

19. The system in accordance with claim 11, wherein an optical coupling element to which light fibers are connected is arranged between the sensor nodes and the supply and reception unit.

20. The system in accordance with claim 11, wherein an optical filter is arranged between the exit surface of the light source of the sensor nodes and the optical fiber.

* * * * *